United States Patent [19] [11] 4,131,564
Dilling [45] Dec. 26, 1978

[54] LIGNIN-CONTAINING DYE DISPERSING COMPOSITION

[75] Inventor: Peter Dilling, Isle of Palms, S.C.

[73] Assignee: Westvaco Corporation, New York, N.Y.

[21] Appl. No.: 909,122

[22] Filed: May 24, 1978

Related U.S. Application Data

[63] Continuation of Ser. No. 716,511, Aug. 23, 1976, abandoned.

[51] Int. Cl.² ............................................. B01F 17/12
[52] U.S. Cl. .................................... 252/353; 8/89 R; 8/92
[58] Field of Search .................... 252/353; 8/89 R, 92

[56] References Cited

U.S. PATENT DOCUMENTS

| 2,161,173 | 6/1939 | Kyrides | 252/353 |
| 2,685,494 | 8/1954 | Marnon | 252/353 |
| 3,153,564 | 10/1964 | Morgan | 8/83 |
| 3,841,887 | 10/1974 | Falkehag et al. | 106/123 LC |
| 3,864,276 | 4/1975 | Benko et al. | 252/353 |
| 3,986,979 | 10/1976 | Moorer et al. | 252/353 |

*Primary Examiner*—Benjamin R. Padgett
*Assistant Examiner*—E. Suzanne Parr
*Attorney, Agent, or Firm*—Ernest B. Lipscomb, III; Terry B. McDaniel

[57] ABSTRACT

A dye dispersing composition having improved fiber staining characteristics, lower viscosity and improved heat stability is disclosed which comprises, a mixture of from 97% to 10% by weight of a sulfonated lignin and from 3% to 90% by weight of an aromatic sulfonic acid or a soluble compound obtained by condensing formaldehyde or its equivalent with an aromatic sulfonic acid.

2 Claims, No Drawings

LIGNIN-CONTAINING DYE DISPERSING COMPOSITION

This is a continuation of application Serial No. 716,511, filed Aug. 23, 1976 now abandoned.

BACKGROUND OF THE INVENTION (1) Field of the Invention

This invention relates to dye dispersants. More particularly, this invention relates to a dispersing composition containing sulfonated lignin and an aromatic sulfonic acid.

(2) The Prior Art

Dyestuff compositions typically comprise a dye cake, i.e., of disperse dyes or vat dyes, and a dispersant. These types of dyestuff compositions are widely used to color both natural and synthetic fibers. In the dyestuff composition, the dispersant serves three basic functions: It assists in reducing the dye particle to a fine size; it maintains a dispersing medium; and it is used as a diluent. Dye dispersants are generally one of two major types, sulfonated lignins from the wood pulping industry or naphthalene sulfonates from the petroleum industry.

The disadvantages of lignins, whether they are sulfite lignins or sulfonated kraft lignins, include fiber staining, reduction of diazo-type dyes, dark brown color and a tendency to stabilize foams. These adverse properties are bothersome to the dyers. Many attempts have been made to modify lignins to overcome their inherent disadvantages. The most common approach to alleviate fiber staining has been to reduce the adsorptive functionality of the lignin over chemical reaction pathways, such as, for example, total or partial blocking of phenolic hydroxyl units. Exemplary of lignin modification for these purposes is set forth in U.S. Pat. No. 3,841,887 to Falkehag et al.

Fiber staining by the lignin occurs mainly on cellulosic and nitrogenous fibers, such as cotton, nylon and wool; polyester fibers are also stained but to a lesser extent. The brown stain tends to impart a dull appearance to the dyed fiber which is undesirable. Moreover, the brown lignin stain tends to fade upon exposure to sunlight.

The disadvantages of naphthalene sulfonates include heat stability and little dye retarding properties. On the other hand, an advantage of lignin dispersant is that it tends to act as a dye retarder. Some dyes have a tendency to start dyeing at very low temperatures. Dyers prefer colors to dye a fiber at a steady rate proportional to temperature increase. If the color dyes too rapidly, the goods take on a streaky appearance; and creases in the material dye more rapidly than the face of the cloth.

With the advantages and disadvantages of various types of dispersants in mind, it is, therefore, the general object of this invention to provide a dye cake dispersant containing a mixture of a sulfonated lignin and an aromatic sulfonic acid that is capable of reducing dye particles to a fine size, satisfactorily dispersing the dye, and substantially reducing fiber staining.

Another object of this invention is to provide a lignin-containing dye dispersing composition having the desired properties that does not require expensive modification of the lignin.

Still another object of this invention is to provide dye dispersing compositions containing sulfonated lignin having a low viscosity.

Yet another object of this invention is to provide dye dispersing compositions containing sulfonated lignins that are heat stable.

Other objects, features and advantages of the invention will be evident from the following detailed description.

SUMMARY OF THE INVENTION

It has been found that the above objects may be accomplished by providing as a dispersing composition comprising a mixture of from 97% to 10% by weight of a sulfonated lignin and from 3% to 90% by weight of an aromatic sulfonic acid or a soluble compound obtained by condensing formaldehyde or its equivalent with an aromatic sulfonic acid.

DETAILED DESCRIPTION OF THE INVENTION

The lignins employed in the dispersant compositions of this invention include both sulfonated alkali lignins and sulfite lignins from acid and neutral processes. The sulfonated lignin portion makes up from 10% to 97% by weight of the composition, preferably 80% to 95% by weight. Alkali lignins are obtained from the sulfate pulping process (known as kraft lignin) and from other alkaline processes, such as the soda or modified soda processes. One of the main sources of sulfonated lignin is the residual pulping liquors of the paper and pulp industries where lignocellulosic materials, such as wood, straw, corn stalks, bagasse and the like, are processed to separate the cellulose or pulp from the lignin. For example, the black liquor obtained from the kraft, soda and other alkali processes is not recovered as a sulfonated product but may easily be sulfonated by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "hydrotropic lignins" derived from hydrotropic pulping processes may be sulfonated and used.

The residual liquors or products containing the lignin portion of the lignocellulosic materials from the various processes may be treated by the conventional methods to sulfonate the lignin to the different degrees desired. The sulfonated lignins were used as salts of ammonia or alkali metals, such as magnesium, calcium, sodium and potassium, with the sodium salt of a sulfonated kraft lignin being preferred. The sulfonated lignins thus obtained may be used as such or may be converted to the free acid form by addition of an acid or by use of ion exchange resins and then converted to salts or complexes of metals or other cations other than that obtained in the sulfonation process.

As used herein, the term "sulfonated lignin" is meant any lignin, whether from the sulfite process, the kraft process or other process, containing at least an effective amount of sulfonate groups to be water-soluble. The degree of sulfonation present in the lignin is not a controlling factor in making the adduct but may be used to tailor the adduct to have desired characteristics. For example, a highly sulfonated lignin may be referred to as one having above 1 mole sulfonation per 1,000 grams of lignin. On the other hand, a sulfonated lignin dispersant having less than 1 mole of sulfonation per 1,000 grams of lignin is referred to as a low degree sulfonated lignin. Any of the sulfonated lignins may contain up to one-half of other materials, such as carbohydrates, phenols and other organic and inorganic compounds. However, some purification of the sulfonated lignin starting material is often desirable. The non-sulfonated lignin materials may be removed by various known methods.

The other portion of the dispersing composition is from 3% to 90% by weight of said composition, preferably 5% to 20%, of one or more members of the class of aromatic compounds of the general structure of sulfonic acids of aromatic hydrocarbons or their derivatives, alone or condensed with formaldehyde or its equivalent. These compounds may be looked upon as derivatives of polyaryl alkyls or their homologues and may be expressed by the general graphical formula (A—R—A') $SO_3M$ in which A and A' designate two or more aromatic groups which may or may not be alike, which are joined to an aliphatic nucleus R, which may consist of a single alkyl group or a plurality of alkyl groups associated in straight chain or branched chain formation, and in which $SO_3M$ designates at least one solubilizing group such as the free sulfonic acid group or a sulfonic acid group in combination with a soluble salt-forming radical. The members of the class may be synthesized either by direct sulfonation of a hydrocarbon or a derivative thereof which possesses the necessary configuration of at least two aromatic nuclei joined to an aliphatic nucleus, or, as is usually more convenient and commercially practical, by causing an aromatic sulfonic acid or a derivative thereof to react with formaldehyde or its equivalent, preferably in the ratio of approximately two moles of aromatic sulfonic acid for each mole of aldehyde. The preferred member of this class is obtained by condensing beta-naphthalene sulfonic acid with formaldehyde.

One satisfactory method for obtaining the condensation product is as follows. To 100 parts of sulfuric acid (specific gravity 1.84) at 160° C. are added slowly with stirring 100 parts of refined naphthalene and stirring continued until substantially none of the naphthalene remains unsulfonated, about 4 hours. The sulfonation mixture is then cooled to about 100° C. and diluted with 44 parts of water to prevent solidification on subsequent cooling. The diluted material is further cooled to 80° C. at which temperature 12 parts of a 40% aqueous solution of formaldehyde are added. This mixture is then stirred for 3 hours longer at 80° C.; but at the end of each successive hour, there are added 12 parts more of formaldehyde solution, making a total at the end of the 3 hours four portions or 48 parts in all. After all the formaldehyde has been added, the temperature is raised over a period of one hour to about 100° C. for about 18 hours, while the mass is constantly stirred. During the later stages of the 18-hour heating period, the mixture progressively thickens until at the end it generally reaches the consistency of thick molasses. If this thickening becomes so great, however, as to prevent proper stirring, a small quantity of water may be added to keep the material liquid. After the heating is completed, the mixture is cooled, neutralized with a suitable alkali, e.g., sodium hydroxide, and if desired, dried. It is then ready for use.

To remove unconsumed sulfuric acid, if desired, the viscous reaction mass is diluted with about three times its volume of water (the amount is not important so long as it is sufficient to permit convenient handling in the subsequent filtering operation) and neutralizing with lime, preferably slaked lime. The neutralized slurry is filtered hot to remove the calcium sulfate precipitate, and to the filtrate is added sodium carbonate to convert the calcium salt of the desired sulfonic acid into its sodium salt. The resulting calcium carbonate precipitate may then be removed by filtration and the filtrate evaporated to dryness.

In place of naphthalene, any aromatic hydrocarbon, such as benzene, diphenyl, anthracene, phenanthrene, fluorene, etc., or any homologue or derivative thereof may be used. When such other aromatic hydrocarbons are used, it is generally necessary to modify the sulfonation and condensation procedure somewhat depending on the compound employed; but these modifications will be apparent to those skilled in the art. Alkylated aromatic compounds, such as, for example, afforded by the sulfonic acids of xylene, cumene, ethyl naphthalene or retene, may also be used. The product obtained as described above by the reaction of naphthalene sulfonic acid with formaldehyde is specifically recommended for use in a preferred form of this invention where the tendency to produce foam is objectionable. Whereas the sulfonic acids of the herein defined class are generally used in the form of their sodium salts, any water-soluble salt or derivative, or even the free acid, may be employed. Salts of monovalent metals, particularly the alkali metals, are preferable, however, to salts of polyvalent metals.

The dispersant compositions of ths invention are particularly useful with disperse dyes or vat dyes in either the dry or liquid form. The dispersing mixture may be added to the dye cake before, during or after grinding. It is generally preferred to add the derivative prior to grinding so that it will be thoroughly mixed and aid in particle size reduction. The amount of dispersant composition added to a dye will vary widely, depending upon the particular dye cake, the material to be dyed and the effect desired. Amounts up to 75% of the dispersant composition based upon the weight of dried dye cake may be used. The most important factor in determining the proper amount of dispersant composition to be used in making up the dyestuff is the particular dye cake used. Generally, this amount will vary from dye to dye.

The relationship of the aromatic sulfonic acid quantities added to the sulfonated lignin is non-linear with regard to fiber staining alleviations, and the staining reduction as given in percentage light reflectance is more distinct at the lower chemical ratios. In other words, these staining improvements do not follow the general rule of mixing of two chemical components, for example, diluting compound (A) which is high in stain with a non-staining compound (B) and thereby alleviating the fiber discoloration problem.

The dispersants of this invention have for the most part eliminated the need for other additives in the dyestuff composition; but for special dyeing problems, wetting agents, defoamers, carriers or other additives may be included.

The practice of this invention may clearly be seen in the following examples

EXAMPLE 1

To illustrate the reduced fiber staining obtained with the dispersant mixtures of this invention, various ratios of a sulfonated kraft lignin and a formaldehyde condensed aromatic sulfonic acid were used to evaluate the reduction in fiber staining as measured by light reflectance. The procedure for determining each physical property is set forth below.

The test for determining the dispersing ability of a dye dispersant was to weigh out 35 grams of the dispersant and mix with 50 grams of C.I. 11110 (Disperse Red 1) dye and 130 grams of water. The mixture was thoroughly stirred and ball milled to a fine particle size. Then the dispersion was filtered through No. 2 Whatman filter paper under vacuum. Then the residual material was determined.

The test for determining extent of fiber staining caused by the dispersant compositions was to weigh out a specified number of grams of the dispersant and dissolve in 200 milliliters of tap water. The pH was adjusted to 4.0 with acetic acid. A 5-gram nylon fiber skein was added and heated to a boil. The mixture was boiled for 15 minutes, and the skein was washed with tap water and dried in an oven at 105° C.

A given amount of the formaldehyde condensed naphthalene sulfonic acid, sold by Rohm and Haas under the trade name TAMOL SN, was mixed therein; and the test procedure outlined above was followed. The light reflectance was measured on Photovolt Corp. light meter, and the results are shown in Table I.

TABLE I

| | FIBER STAINING | |
|---|---|---|
| Run No. | Quantities of TAMOL SN added to 5 grams of Lignin (g) | Light Reflectance of Lignin-TAMOL Mixture at pH = 4 (%) |
| 1 | 0.00 | 48 |
| 2 | 0.25 | 53 |
| 3 | 0.50 | 56 |
| 4 | 1.00 | 58 |
| 5 | 2.50 | 62.5 |
| 6 | 5.00 | 67.5 |
| 7 | 10.00 | 71 |

The increased light reflectance indicating lower fiber staining with the addition of TAMOL SN/sulfonated lignin dispersant composition shows the synergism produced by the dye dispersing compositions of this invention.

EXAMPLE 2

As stated herein, viscosity advantages of the sulfonated lignin-TAMOL mixtures are obtained. Viscosity characteristics at various pH's are shown in Table II. The sulfonated lignin used was REAX ® 85A manufactured by Westvaco Corporation. TAMOL is an anionic, polymer-type formaldehyde cross-linked naphthalene sulfonate sold by Rohm and Haas.

TABLE II

| | | VISCOSITY (c.p.s. at 25% solids at 25° C.) | | | | |
|---|---|---|---|---|---|---|
| | | | pH = 8 | pH = 7 | pH = 6.3 | pH = 5 | pH = 4 |
| 1 | REAX | (100%) | 47.5 | 200.0 | 2932.0 | Solid | Solid |
| 2 | REAX-TAMOL | (75% – 25%) | 8.0 | 8.2 | 9.0 | 12.5 | 70.0 |
| 3 | REAX-TAMOL | (50% – 50%) | 6.0 | 5.5 | 6.0 | 6.0 | 6.3 |
| 4 | REAX-TAMOL | (25% – 75%) | 3.8 | 4.2 | 4.5 | — | — |
| 5 | TAMOL | (100%) | 2.5 | 3.2 | 3.5 | — | — |

The reduction in viscosity of the sulfonated lignin dispersant with even small quantities is dramatic and unexpected. The viscosity reduction is even more prevalent at the lower pH's.

EXAMPLE 3

Another advantage of the sulfonated lignin-naphthalene sulfonate compositions of this invention is heat stability. A mixture of 50 grams of Vat Red 60 dye, 35 grams of sulfonated lignin/TAMOL mixture (90%/10%), 125 milliliters of water and 5 drops of EDTA (1% solids at pH 10–10.5) was pH adjusted to 8 with acetic acid. This dye composition was ground in a ball mill to the point where the dispersion test was passed. To determine heat stability, one (1) gram of solid dye composition was added to 250 milliliters of water; and the solution was boiled for 15 minutes and then filtered through a tarred Whatman filter paper, dried and the residual dye material remaining on the filter was calculated.

Excellent results were obtained when 10% TAMOL SN was added to sulfonated lignin amounting to 44% improvement over the sulfonated lignin alone.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A low viscosity, heat stable dye dispersant composition having reduced tendency to stain fibers consisting of,
    (a) from 97% to 10% by weight of said composition of a sulfonated kraft lignin, and
    (b) from 3% to 90% by weight of said composition of a formaldehyde condensed naphthalene sulfonate.

2. The dispersant composition of claim 1 wherein said sulfonated kraft lignin is present in an amount of 80% to 95% of said composition.

* * * * *